Figure 1:
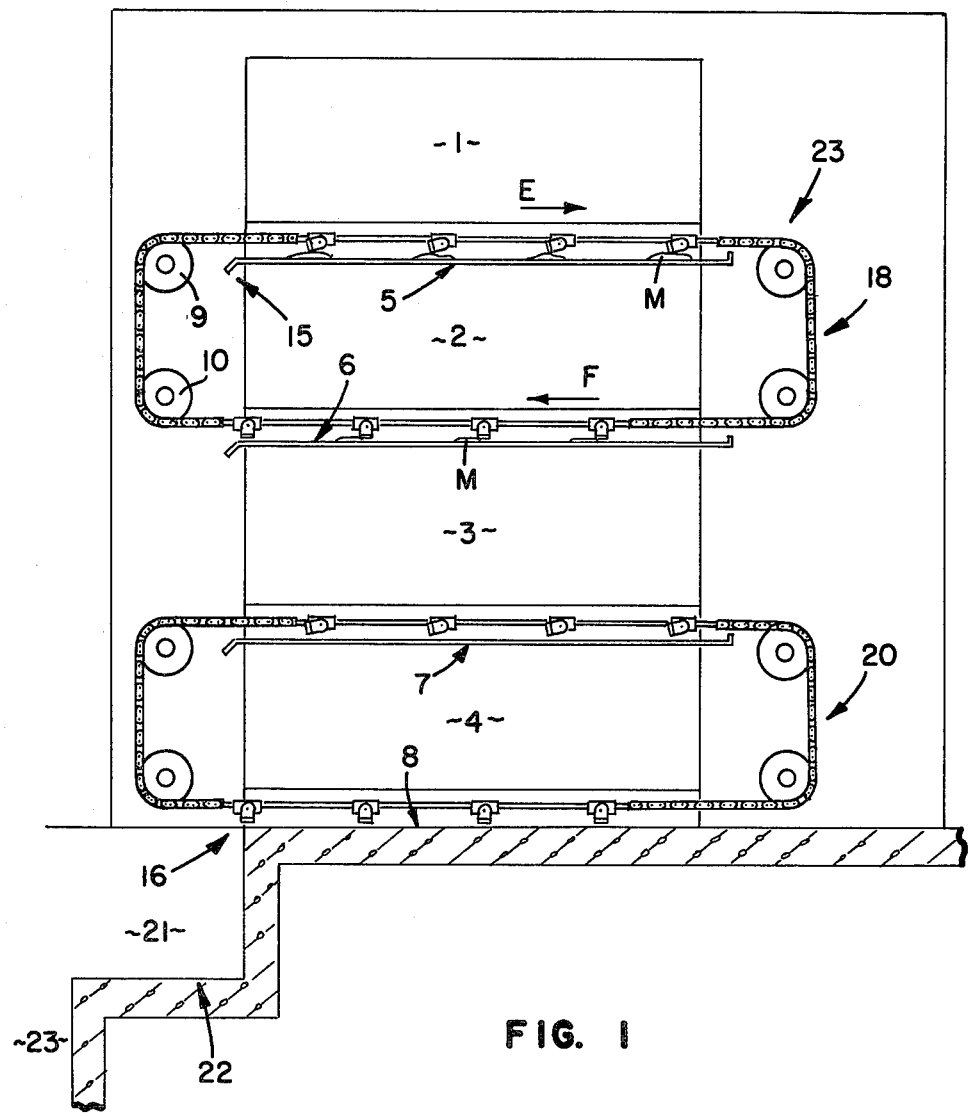

United States Patent [19]

Kuhlmann

[11] 4,357,904
[45] Nov. 9, 1982

[54] CONVEYOR FOR THE REMOVAL OF DROPPINGS FOR BATTERY-DESIGNED POULTRY CAGE INSTALLATIONS

[76] Inventor: Josef H. Kuhlmann, Konigstrasse 41, D-4401 Laer, Fed. Rep. of Germany

[21] Appl. No.: 269,962

[22] Filed: Jun. 3, 1981

[30] Foreign Application Priority Data

Jun. 11, 1980 [DE] Fed. Rep. of Germany ....... 3021860

[51] Int. Cl.³ ............................................ A01K 31/04
[52] U.S. Cl. ...................................................... 119/22
[58] Field of Search ...................... 119/22, 28; 198/748

[56] References Cited

U.S. PATENT DOCUMENTS

| | | | |
|---|---|---|---|
| 667,201 | 2/1901 | Edison | 198/500 |
| 1,274,219 | 7/1918 | Ulbrecht | 198/748 |
| 2,294,025 | 8/1942 | Dagg | 119/22 |
| 2,448,120 | 8/1948 | Petraske | 119/22 |
| 2,843,086 | 7/1958 | Graham | 119/22 |
| 3,033,348 | 5/1962 | Andrew | |
| 3,810,444 | 5/1974 | Conley | 119/22 |

FOREIGN PATENT DOCUMENTS 7002678 1/1970 Fed. Rep. of Germany .

Primary Examiner—Hugh R. Chamblee
Attorney, Agent, or Firm—Merchant, Gould, Smith, Edell, Welter & Schmidt

[57] ABSTRACT

The invention relates to a conveyor for the removal of poultry droppings, preferably for battery-designed poultry cage installations, the same running over dropping pans, equiped with scraper bars which are fastened to aligned swivel shafts at a right angle to the conveying direction, so that in one direction the bars are prevented from swiveling, thus conveying the droppings, while on the return movement are disengaged from the effective position of conveying, thus causing the same to glide over the droppings.

4 Claims, 2 Drawing Figures

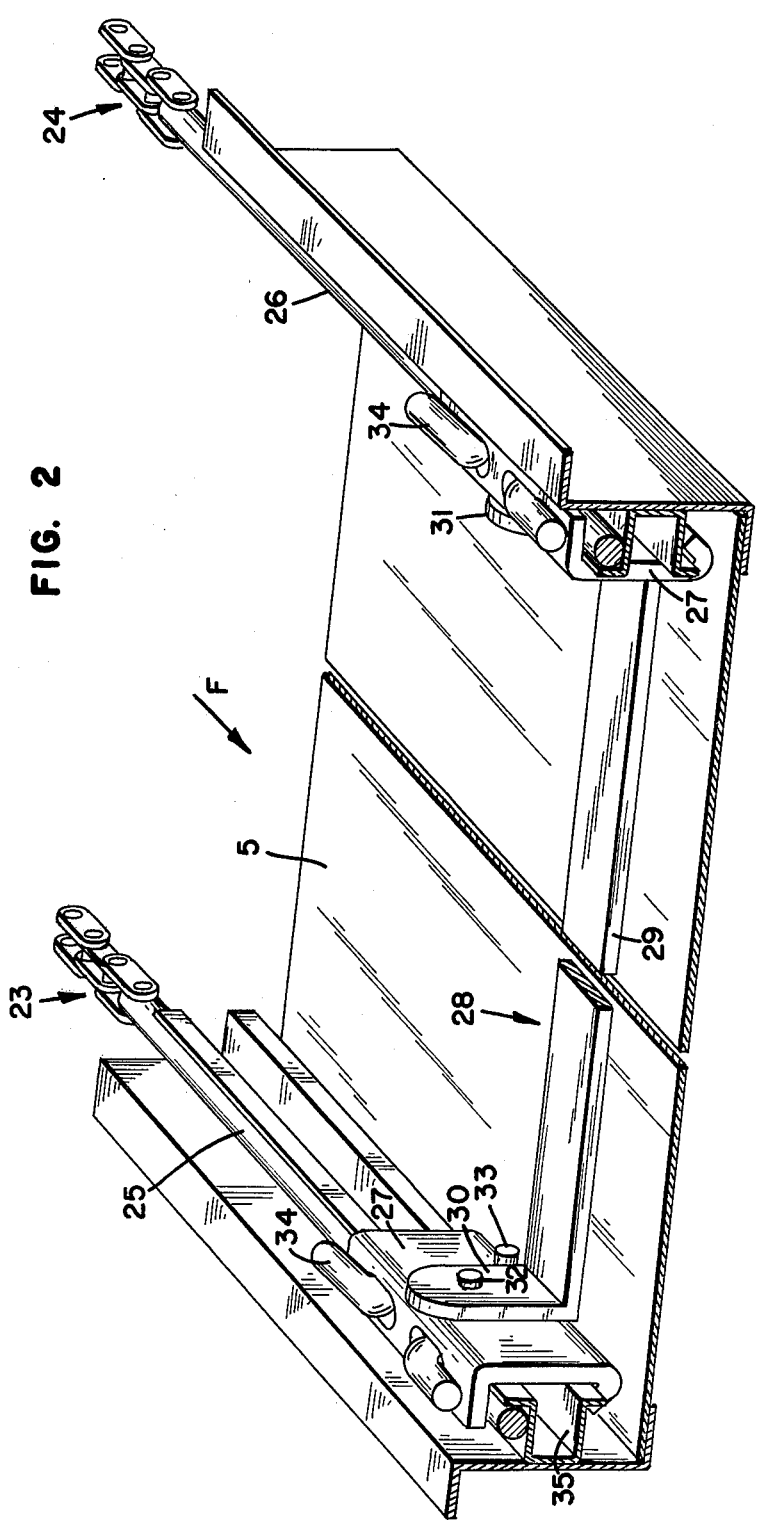

CONVEYOR FOR THE REMOVAL OF DROPPINGS FOR BATTERY-DESIGNED POULTRY CAGE INSTALLATIONS

The invention relates to a conveyor for the removal of droppings in battery-designed poultry cage installations, equipped with seat gratings above dropping pans over which the conveyor travels. The same consists of a drawing device carrying scraper bars guided over return rollers.

Arrangements of this kind have been published, for instance, in DE-PS 19 36 290. Those known arrangements are equipped with rotating chains, which carry scraper bars and revolve around the individual cages. With this arrangement according to DE-GM 79 20 942, the scraper bars are fastened to the center of the chain. Therefore, this conveyor installation has only a single chain, which has the disadvantage that the chain is constantly moving through very corrosive droppings.

With both arrangements, in particular with long and large conveyor installations, the possibility exists for the droppings to accumulate to the point that the conveyed droppings reach the seat gratings and eventually press through them.

The object of the invention is to remedy and also to provide, that the path of movement of the chains be held as short as possible and to facilitate the installation of rigid pull rods instead of chains. By this means, corrosion-effects are minimized, because of the absence of numerous movable links.

The object of the invention is solved by the claimed mentioned means, in particular by creating a short path of conveying, that at the same time achieves a total and efficient way of removing the droppings.

A further characteristic of the invention is the design of the actual scraper bars. The same being made, by way of example, out of iron flat stock, thus by this design, preventing with certainty an accumulation of droppings and so eliminating the droppings pressing through the gratings.

An example of operation of the invention is explained in the following drawings. The drawings show:

FIG. 1 is a schematic view of a conveyor installation and in

FIG. II on an essentially larger scale the design of the swiveling scraper bar.

In the drawing of FIG. I, by numerals 1, 2, 3 and 4, are shown four on top of one another arranged levels of a battery-designed poultry cage installation, the same consisting of individual cages where the hens are housed, the bottom of the cage being closed off by a grating and the front equipped with appropriate facilities for feeding purposes, as well as with appropriate devices for the collection of eggs, which by the way are not the object of the invention and therefore will not be illustrated any further.

Under each grating of the cages is a dropping pan 5, 6, 7, 8, on which the falling droppings, coming through the gratings, are collected. Nine and 10 designate return rollers, which, in the displayed example of operation the rollers 10 are respectively designed as drive rollers and are driven by an electric motor which is not shown. Around the rollers 9 and 10 are chains 12 which carry between them bars 14, thus showing the design of the conveyor 18 and 20. The direction of conveying is shown with arrow F, as well as the accumulated mounds of droppings with M.

The dropping pan 5, which is located below the upper level 1 is so designed that the discharge 15 in vertical projection will still find itself, at this point, in the area of dropping pan 6, which is located below the second level 2. The result is that the collected droppings on pan 5, which are collected by the moving conveyor 18 going in the direction of arrow E, fall over discharge 15 on to dropping pan 6, so that on its return the conveyor picks up the accumulated droppings from pan 6 and discharges them over discharge 16. From discharge end 16 the droppings go over a chute and fall freely in to a droppings collecting room 21 shown in general, which by way of example could be located in the basement or foundation of the general installation, the same consisting of a horizontal floor 22. The design of the conveyor is more clearly seen in FIG. II. In FIG. II the conveyor chains are marked 23 and 24, which are located solely in the area of the return rollers 9 and 10, while in the rest of the area of the conveyor there is provided for pull rods 25 and 26, which carry the actual scraper bars via pull rod fasteners 27.

The scraper bar, shown by way of example, is a bar 29 made of iron flat stock and two upright flanges 30 and 31, which are attached in the form of swivel joints (in FIG. II and swivel joint 32 can be clearly identified) to the pull rod fasteners 27. Those pull rod fasteners also carry stop pin 33, which limits any swivel movement of the scraper bar 28, so that any movement of the scraper bar 28 is possible only in one direction. By the shown design in FIG. II the actual direction of the conveyor is shown with arrow F, so that the actual bar 29 of the scraper bar 28 finds itself against stop pin 33 and so drags along the droppings which accumulate on the dropping pan 5, where there were small mounds of droppings. The return movement causes a lift of scraper bar 28, which swivels around swivel joint 32, so that now the scraper bar can glide over the still present droppings or the conveyed mound M and only by the next return movement will a picking up of droppings takes place.

The pull rods 25 are attached to the pull rod fasteners 27 by way of hooks 34, thus making it easy to replace these components.

The pull rod fasteners 27, as shown in the drawings, take the form of U-shaped components and embrace corresponding hat-shaped sections 35. The same serve for guiding of the pull rods 25 and over the pull rod fasteners 27 of the scraper bars 28. All those components could, by way of example, be made out of metal.

The conveyor, according to the design of the invention, moves constantly back and forth, so that no great accumulations of droppings M can take place, and since the droppings are almost continuously being moved, an accumulation of droppings pressing through the gratings is thereby totally eliminated.

Over and beyond what FIG. I shows in conjunction with FIG. II, it is clear that the design according to the invention makes it possible to operate the conveyor in both directions, in spite of the similar construction of all components. For example, in FIG. II, it becomes evident that by moving fastener 27, which is shown on the left side of the drawing, to the right side of the conveyor, which brings stop pin 33 in front of the actual scraper bar, thus causing the arrest of the scraper bar in the opposite direction, it is possible for the user of the facility to determine the direction of operation of the conveyor. This has the advantage that under certain local given conditions, the one or the other frontside of the conveyor be kept clear, making it easier to perform maintenance or any other required work to be done.

Since the scraper bars don't have to deal with great loads, it is possible to use synthetic materials for their construction. Those materials also show much greater resistance to possible corrosion.

What is claimed is:

1. A conveyor for the removal of droppings for battery-designed poultry cage installations with seat gratings above dropping pans over which a conveyor travels comprising:

a drawing device carrying scraper bars attached thereto, return rollers on which said drawing device is guided;

swivel shaft means aligned perpendicularly to the direction of travel of the drawing device for attaching said scraper bars to said drawing device so that said bars will be prevented from swiveling when said drawing device is moving in a reverse direction and so that said bars will be allowed to swivel when said drawing device is moving in a forward direction thereby allowing said bars to pass over accumulations on said dropping pans;

said scraper bars having a first portion affixed to said swivel shaft means and a second portion extending orthogonally from said first portion, said second portion having top and bottom parallel planar surfaces and a front and rear surfaces substantially parallel to each other and orthogonal to said top and bottom surfaces;

said bottom surface being disposed adjacent said pans when said device is moving in the reverse direction, and said front and rear surfaces being thinner than said top and bottom surfaces.

2. A conveyor for removal of droppings for battery-designed poultry cage installations with seat gratings above dropping pans over which a conveyor travels comprising:

a drawing device carrying scraper bars attached thereto, return rollers on which said drawing device is guided;

swivel shaft means aligned perpendicularly to the direction of travel of the drawing device for attaching said scraper bars to said drawing device so that said bars will be prevented from swiveling when said drawing device is moving in a reverse direction and so that said bars will be allowed to swivel when said drawing device is moving in a forward direction thereby allowing said bars to pass over accumulations on said dropping pans;

said scraper bars having a first portion affixed to said swivel shaft means and a second portion extending orthogonally from said first portion, said second portion having top and bottom parallel planar surfaces and a front and rear surfaces substantially parallel to each other and orthogonal to said top and bottom surfaces;

said bottom surface being disposed adjacent said pan when said device is moving in the reverse direction; and said front and rear surfaces having a vertical dimension substantially less than the distance from said swivel means to said pan.

3. A conveyor for removal of poultry droppings according to claims 1 or 2 wherein the conveyor includes fixed support members and wherein pull rods having hook ends are in slidable contact with said support members and wherein said hook ends engage said drawing device, conveyor chains being connected to said pull rods.

4. A conveyor for the removal of poultry droppings according to claim 3 wherein said swivel shaft means includes projecting stop pin disposed to contact said flange end so as to limit the movement of said scraper bar.

* * * * *